United States Patent [19]
Cobb et al.

[11] Patent Number: 6,138,067
[45] Date of Patent: Oct. 24, 2000

[54] ADAPTIVE PRESSURE BASED WEIGHT ESTIMATION SYSTEM FOR A VEHICLE OCCUPANT

[75] Inventors: Gregory Allen Cobb; Morgan Daniel Murphy; Pamela Ann Roe, all of Kokomo, Ind.

[73] Assignee: Delco Electronics Corporation, Kokomo, Ind.

[21] Appl. No.: 09/088,038

[22] Filed: Jun. 1, 1998

Related U.S. Application Data

[63] Continuation-in-part of application No. 08/923,020, Sep. 3, 1997.

[51] Int. Cl.$^7$ .............................. G06F 17/00; B60R 22/00
[52] U.S. Cl. .............................. 701/45; 701/36; 280/735; 280/730.1; 180/268; 340/667; 340/666
[58] Field of Search .................... 701/36, 45, 46, 701/47, 49; 280/730.1, 735, 734; 180/268, 271, 273, 282; 340/436, 665, 666, 667; 297/452.41, 284.6, 195.12

[56] References Cited

U.S. PATENT DOCUMENTS

| | | | |
|---|---|---|---|
| 5,474,327 | 12/1995 | Schousek | 280/735 |
| 5,626,359 | 5/1997 | Steffens, Jr. et al. | 280/735 |
| 5,658,050 | 8/1997 | Lorbiecki | 297/452.41 |
| 5,739,757 | 4/1998 | Gioutsos | 340/667 |
| 5,748,473 | 5/1998 | Breed et al. | 701/45 |
| 5,810,392 | 9/1998 | Gagnon | 280/735 |
| 5,877,677 | 3/1999 | Fleming et al. | 340/436 |
| 5,957,491 | 9/1999 | Cech et al. | 280/735 |
| 5,987,370 | 11/1999 | Murphy et al. | 701/45 |

*Primary Examiner*—Jacques H. Louis-Jacques
*Attorney, Agent, or Firm*—Jimmy J. Funke

[57] ABSTRACT

An improved pressure-based weight estimation system that includes an adaptive technique for reliably and accurately determining the vacant, or unoccupied, seat pressure. The vacant seat pressure is initially determined by a factory calibration procedure, and is thereafter suitably updated by an adaptive learning algorithm based on temperature, time, and the measured pressure. If the seat temperature is within a normal range, and the measured pressure remains at least a predetermined amount below the calibrated vacant seat pressure for at least a predetermined time, a fraction of the difference between the measured and calibrated values is subtracted from the calibrated value to form a new calibration value. The predetermined difference amount determines the sensitivity of the control, and the predetermined time prevents adaptive correction of the calibration value due to transient pressure conditions.

12 Claims, 5 Drawing Sheets

ADAPTIVE PRESSURE BASED WEIGHT ESTIMATION SYSTEM FOR A VEHICLE OCCUPANT

RELATED APPLICATIONS

This application is a continuation-in-part of U.S. Ser. No. 08/923,020, entitled Vehicle Occupant Weight Estimation Apparatus Having Fluid-Filled Seat Bladder, filed Sep. 3, 1997 and assigned to the assignee of the present invention.

FIELD OF THE INVENTION

This invention relates to a system for estimating the weight of a vehicle occupant by analyzing the pressure detected by a pressure sensor installed in the occupied vehicle seat, and more particularly to a system that adapts the weight estimate to compensate for changes due to aging of the system.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. Another technique, described in U.S. Ser. No. 08/801,218, entitled Adaptive Seating System, filed on Feb. 19, 1997 and assigned to General Motors Corporation, involves measuring and adjusting the pressure in several inflated bladders variously located in a given passenger seat. When a sharp increase in the measured pressures is detected, the passenger weight is estimated based on a comparison of current pressures with previously measured "vacant seat" pressures.

With most of these systems, the weight of the occupant is determined based upon a difference between the measured pressure and a zero, or vacant, seat pressure corresponding to an unoccupied seat. The vacant seat pressure may be determined by a factory calibration procedure, or empirically during normal usage as disclosed in the aforementioned U.S. Ser. No. 08/801,218. However, the vacant seat pressure tends to shift with aging and usage of the seat, in ways that may be difficult to determine empirically. Accordingly, it is desired to provide a system that can reliably and accurately determine the vacant seat pressure.

SUMMARY OF THE PRESENT INVENTION

The present invention is directed to an improved pressure-based weight estimation system that includes an adaptive technique for reliably and accurately determining the vacant, or unoccupied, seat pressure. According to the invention, the vacant seat pressure, referred to herein as Pzero, is initially determined by a factory calibration procedure, and is thereafter suitably updated by an adaptive learning algorithm based on temperature, time, and the measured pressure.

It has been found that the vacant seat pressure of a vehicle seat tends to shift over time as the seat fabric and springs gradually stretch and the seat foam gradually compresses and wears. In general, these phenomena are referred to herein as aging effects, and always result in lowering of the vacant seat pressure. Most of the shifting due to aging effects occurs within the first six months or so of usage, but some shifting continues to occur over longer periods of time. The shifting due to aging effects is also temperature dependent—at high and low temperature extremes, temperature-based effects, such as foam stiffness, tend to dominate shifting of the vacant seat pressure, while at intermediate temperatures, the aging effects tend to dominate.

A pressure estimation system according to this invention utilizes the above-described discoveries to accurately and reliably determine the vacant seat pressure. If the seat temperature is within a normal range bounded by upper and lower temperature values, and the measured pressure remains at least a predetermined amount below the calibrated vacant seat pressure Pzero, for at least a predetermined time, a fraction of the difference between the measured and calibrated values is subtracted from the calibrated value to form a new calibration value. The predetermined difference amount determines the sensitivity of the control, and the predetermined time prevents adaptive correction of the calibration value due to transient pressure conditions. The fraction of the difference that is subtracted from the calibration value may be thought of as the gain of the control, and may be adjusted downward over time since most of the shifting tends to occur in the first several months of use, as indicated above.

The above-described control is disclosed in the context of an occupant weight estimation system in which a closed, elastomeric bladder filled with fluid is installed in the foam cushion of a vehicle seat bottom, with at least one pressure sensor installed in a closed exit port of the bladder. A temperature sensor disposed in proximity to the bladder provides the seat temperature measurement, and a controller estimates the weight of the occupant based on the temperature and pressure signals, using the above-described control for periodically re-calibrating the vacant seat pressure.

DETAILED DESCRIPTION OF THE DRAWINGS

Figure 1:
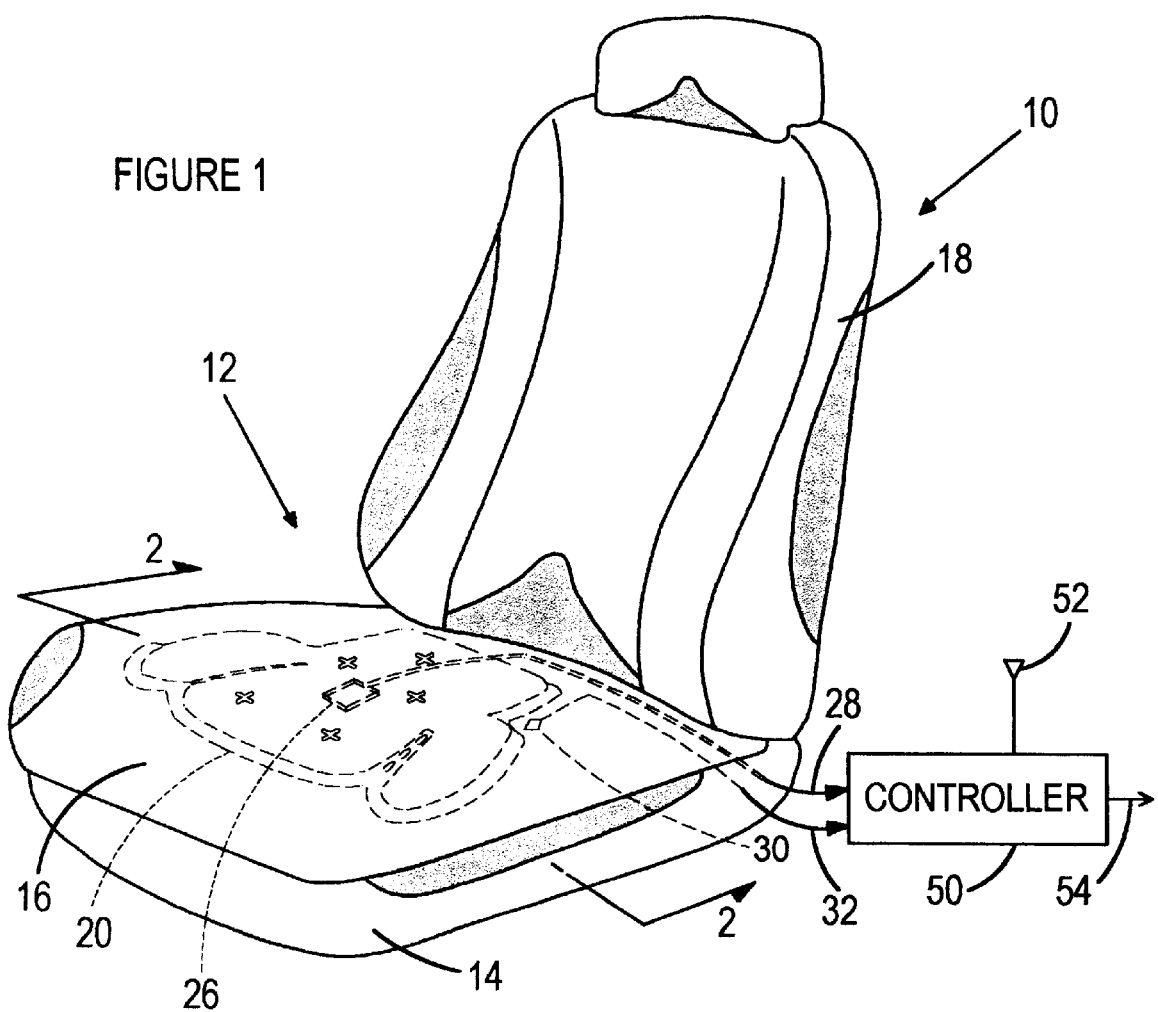
FIG. 1 is a system diagram illustrating a passenger seat of a vehicle equipped with fluid-filled bladders and a controller for estimating the weight of a seat occupant in accordance with this invention.

Referring to the drawings, and particularly to FIG. 1, the reference numeral 10 generally designates a vehicle occupant weight estimation apparatus according to this invention. The vehicle seat 12 is supported on a frame 14, and includes foam cushions 16 and 18 on the seat bottom and back. A vacuum formed polymeric bladder 20 disposed in the foam cushion 16 substantially parallel with the central seating surface preferably contains a fluid such as silicone which is noncorrosive, and not subject to freezing at extreme ambient temperatures.

Figure 2:
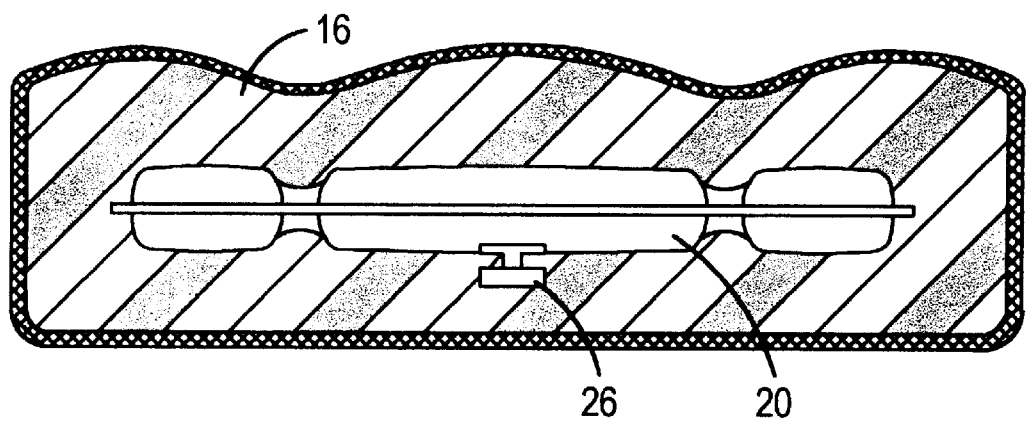
FIG. 2 is a cross-section view of the foam seat cushion and fluid-filled bladder of FIG. 1.

Referring to FIGS. 1, 2, and 3, the bladder 20 is sealed about the inlet port 24 of a pressure sensor 26, which provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26.

The electrical pressure and temperature signals on lines 28 and 32 are provided as inputs to a controller 50, which determines if the seat 12 is occupied and estimates the weight of the occupant based on the pressure and temperature signals, possibly in combination with other inputs, such as an atmospheric pressure signal provided pressure sensor 52. An electrical output signal indicative of the weight estimation is provided on line 54, and may be used, for example, as a factor in determining whether and how forcefully to deploy air bags or other pyrotechnically deployed restraints in a crash event. The controller 50 may be mechanized with a suitably programmed microprocessor, as described below in reference to FIGS. 4–7.

In general, the fluid has a nominal or unloaded pressure which provides a baseline or reference value, referred to herein as Pzero, and the sensed pressure increases monotonically with occupant weight applied to the cushion 16. The temperature measurement is used to compensate the weight or pressure measurement for corresponding changes in foam and bladder stiffness at temperature extremes, and to determine if re-calibration of Pzero should be enabled.

Preferably, the pressure sensor 26 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the sensor 26 includes a second inlet (not shown) open to atmospheric pressure. Alternately, the sensor 26 may provide an absolute pressure measurement of the bladder fluid, and the controller 50 may compensate the measurement for atmospheric pressure variations by reducing the fluid pressure measurement by the atmospheric pressure measurement provided by sensor 52.

Figure 3A:
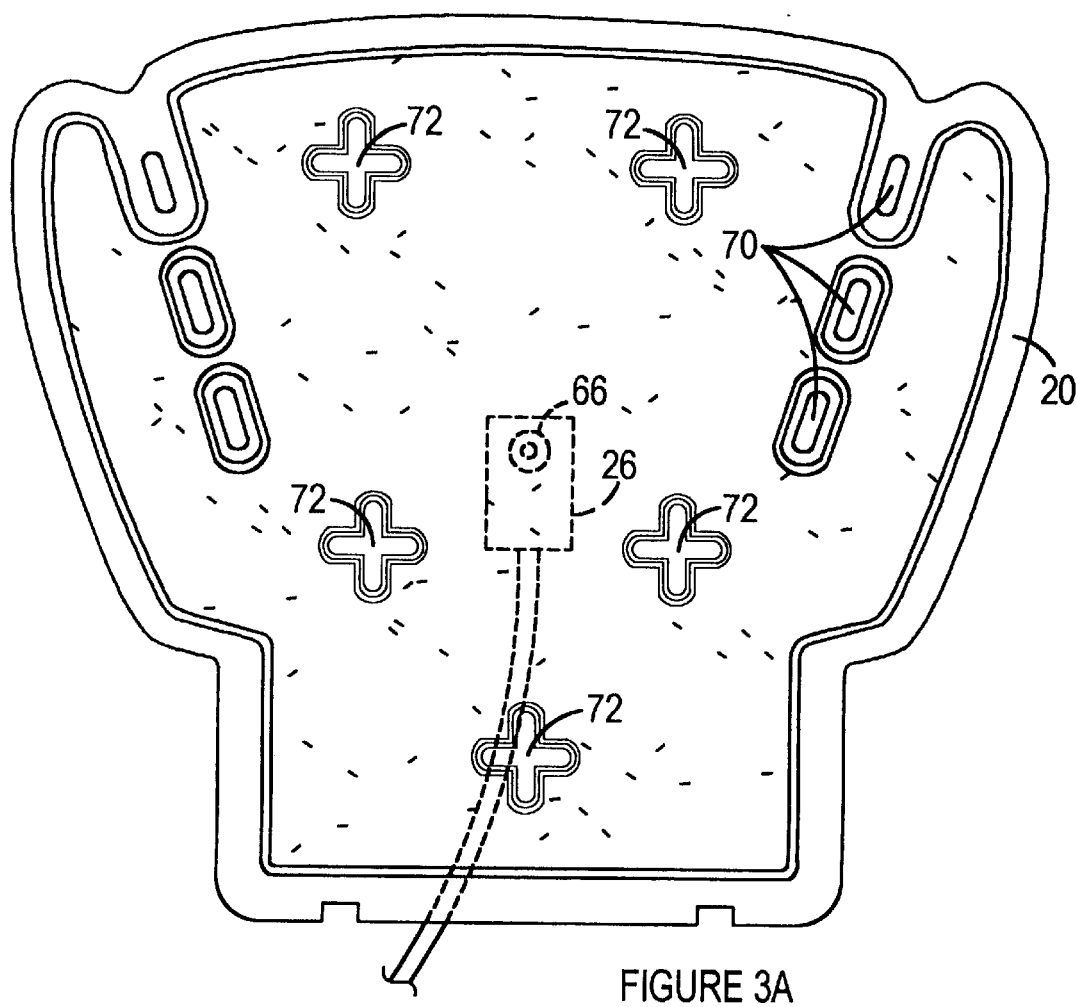
FIGS. 3A–3C depict more detailed views of the bladder and pressure sensor configuration of FIG. 1.
Figure 3B:
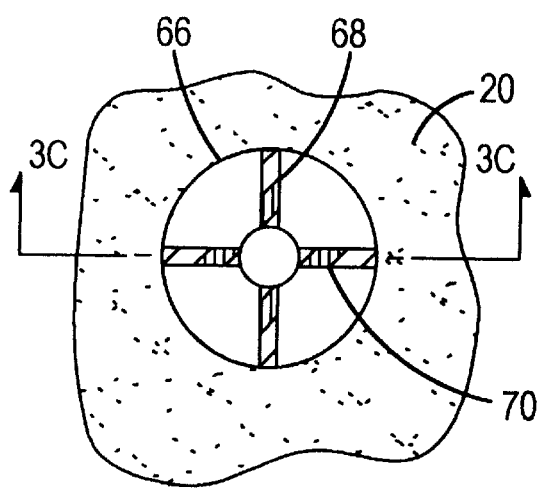
Figure 3C:
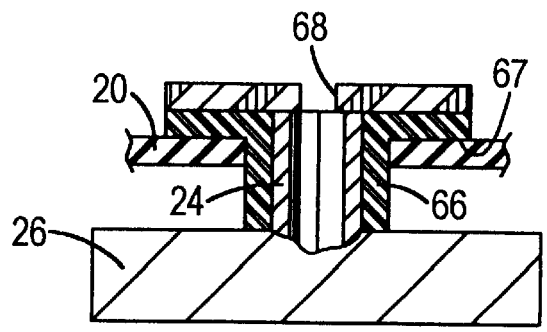

It has been found that the pressure sensed by sensor 26 experiences significant variability with changes in the orientation of the bladder when the center of gravity of the bladder fluid changes relative to the location of the exit port 22. This can occur when there is fore-aft pitch due to uphill or downhill operation of the vehicle, or when there is roll due to turning. Accordingly, the exit tube and sensor are preferably configured so as to sense the fluid pressure at the center of gravity of bladder 20. This can be done, as shown in FIGS. 3A–3C, by means of a tube 66 coupled to the sensor 26, with the bladder 20 sealed around the tube 66 at a shoulder 67 thereof. The tube 66, depicted in detail in FIGS. 3B–3C, is configured with side ports 68, 70 to ensure open fluid communication between the bladder fluid and the sensor 26 at all times. Preferably, the length of tube 66 is minimized by placing the pressure sensor inlet 24 in close proximity to bladder 20, as shown in FIGS. 3A and 3C. However, the sensor 26 may be located remote from the bladder if required by simply extending the tube 66; in this case, the tube 66 should have a relatively small diameter to minimize the pitch and roll effects on the fluid in the tube 66.

As also seen in FIG. 3A, the bladder 20 generally conforms to the shape of the seat bottom 16. Various openings and crimp areas 70 allow the bladder 20 to conform to the shape of the seat cushion, while other crimp areas 72 are required to properly position the bladder in the vacuum form equipment. The crimp areas 70, 72 do not degrade the pressure measurement since the fluid can freely flow in and out of the various areas or cells of the bladder 20. In fact, the crimp areas can be advantageously used to reduce the overall volume, and thus the weight, of the bladder 20, provided that friction losses from fluid flow within the bladder 20 are minimized.

Figure 4:
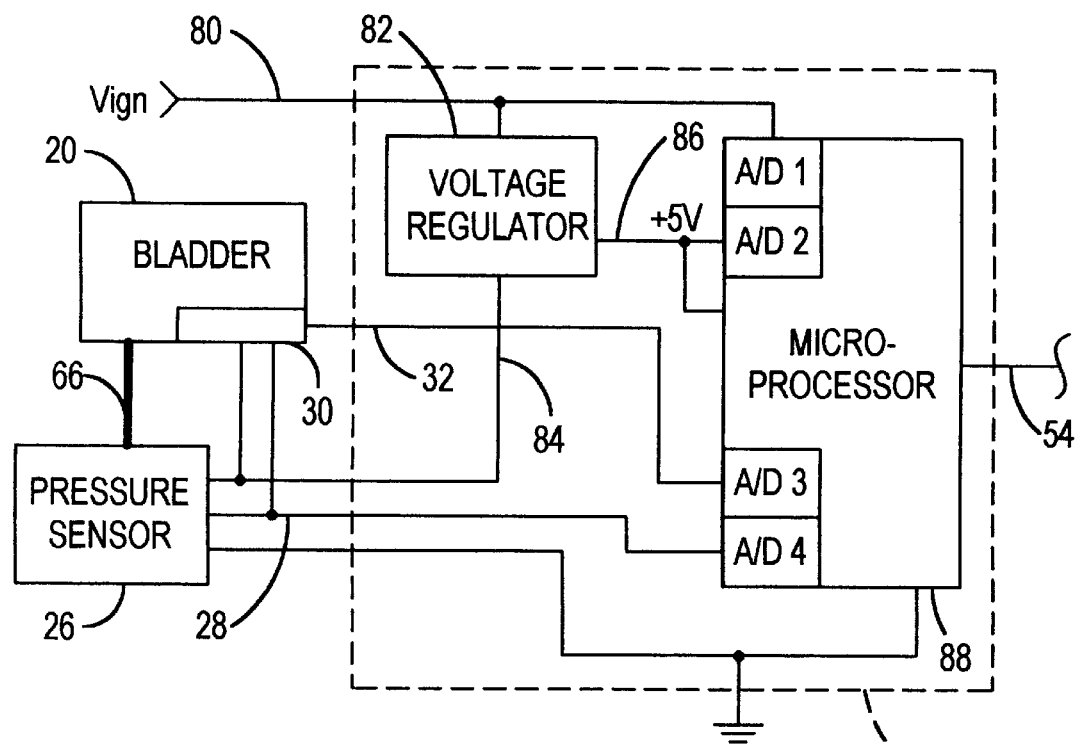
FIG. 4 is a block diagram of the controller of FIG. 1, in the context of an air bag deployment system.

FIG. 4 depicts the occupant weight estimation apparatus of the present invention in the context of an air bag deployment system in which the controller 50 provides an output signal on line 54 indicating whether deployment should be inhibited or allowed based on sensed occupant weight. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1–A/D 4 which receive the ignition voltage Vign, the system voltage of voltage regulator 82, the temperature sensor output voltage on line 32, and the pressure sensor output voltage on line 28.

Based on the above-described inputs, the microprocessor 88 determines the occupant weight, and based on predetermined criteria, whether air bag deployment should be inhibited or allowed. In the illustrated control strategy, air bag deployment is to be inhibited for occupants below a predetermined weight, referred to herein as the threshold weight.

Figure 5:
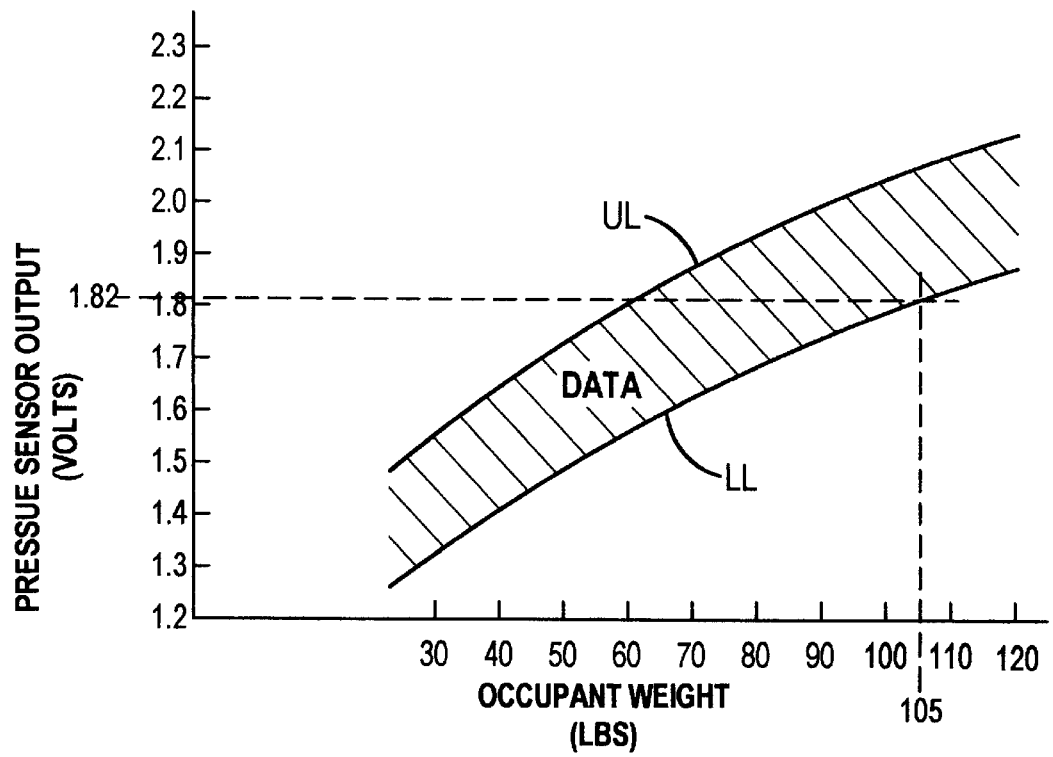
FIG. 5 is a graph depicting pressure sensor output voltage as a function of occupant weight, as used in the system of FIG. 4.

In general, once the occupant weight estimation system 10 is installed in a vehicle, the vacant seat pressure Pzero is determined and stored as a calibration value. For like installations, the relationship between occupant weight and the sensed pressure is empirically determined at a variety of temperatures. In a system as suggested in FIG. 1, the data can be used to construct either a mathematical model or a multi-dimensional look-up table of occupant weight as a function of temperature and sensed pressure, with the model or table programmed into the microprocessor and used to determine and output the occupant weight on line 54. In the system of FIG. 4, however, the output merely indicates whether the occupant is above or below the threshold weight, within the system tolerance constraints. In this case, the empirically determined data may be plotted as shown in FIG. 5, and used to develop a pressure sensor threshold voltage for determining whether deployment should be inhibited or allowed. For the data represented in FIG. 5, for example, the lines designated as upper limit UL and lower limit LL bound the pressure sensor output voltage variability for any given occupant weight. Given a threshold weight, such as 105 lbs for example, the lower limit LL defines a threshold voltage which is the minimum voltage, approximately 1.82 volts, one would expect to see for an occupant weighing 105 lbs.

Figure 6:
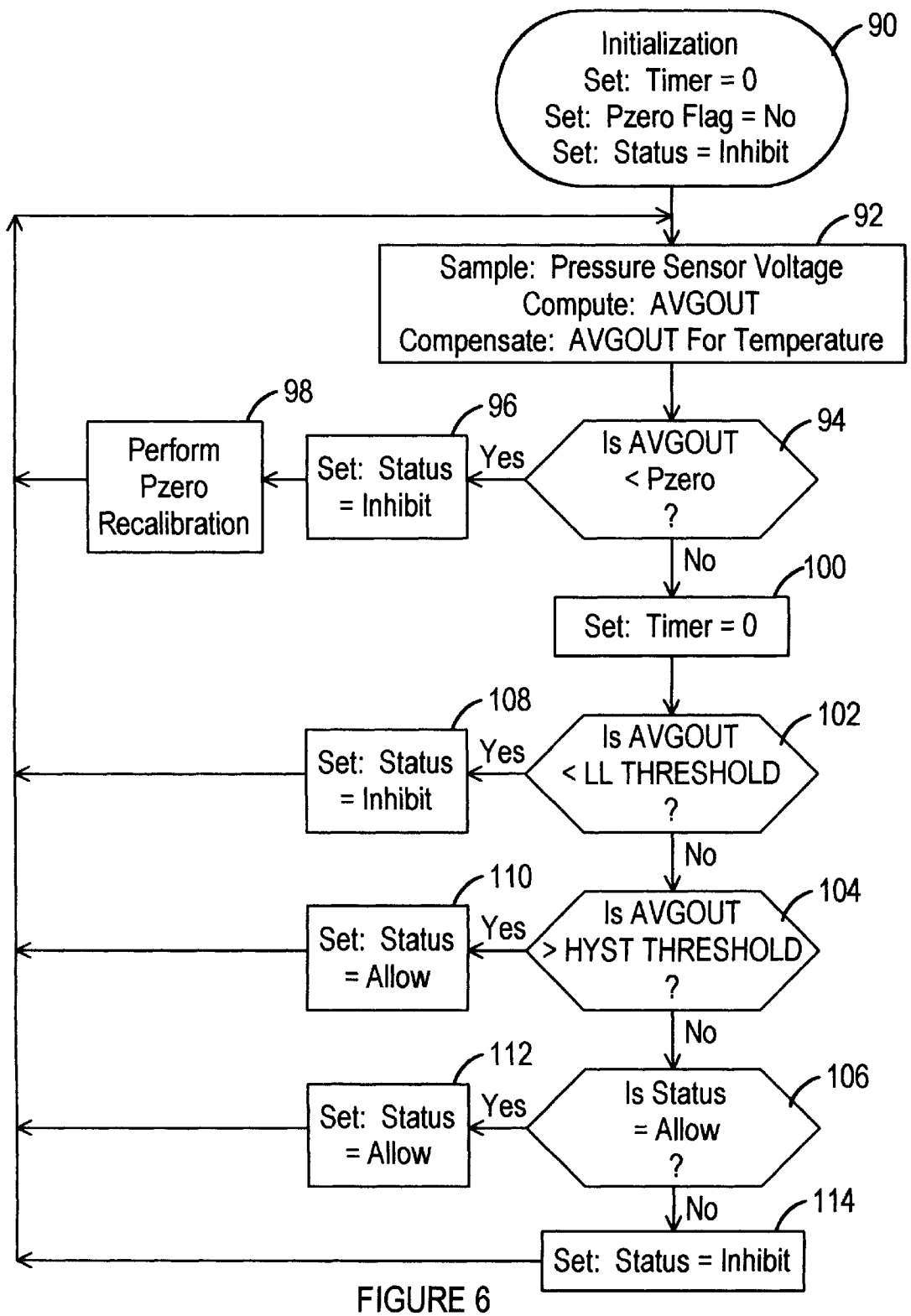
FIGS. 6–7 are flow charts representative of computer program instructions executed by the controller of FIG. 4 in carrying out the control of this invention.
Figure 7:
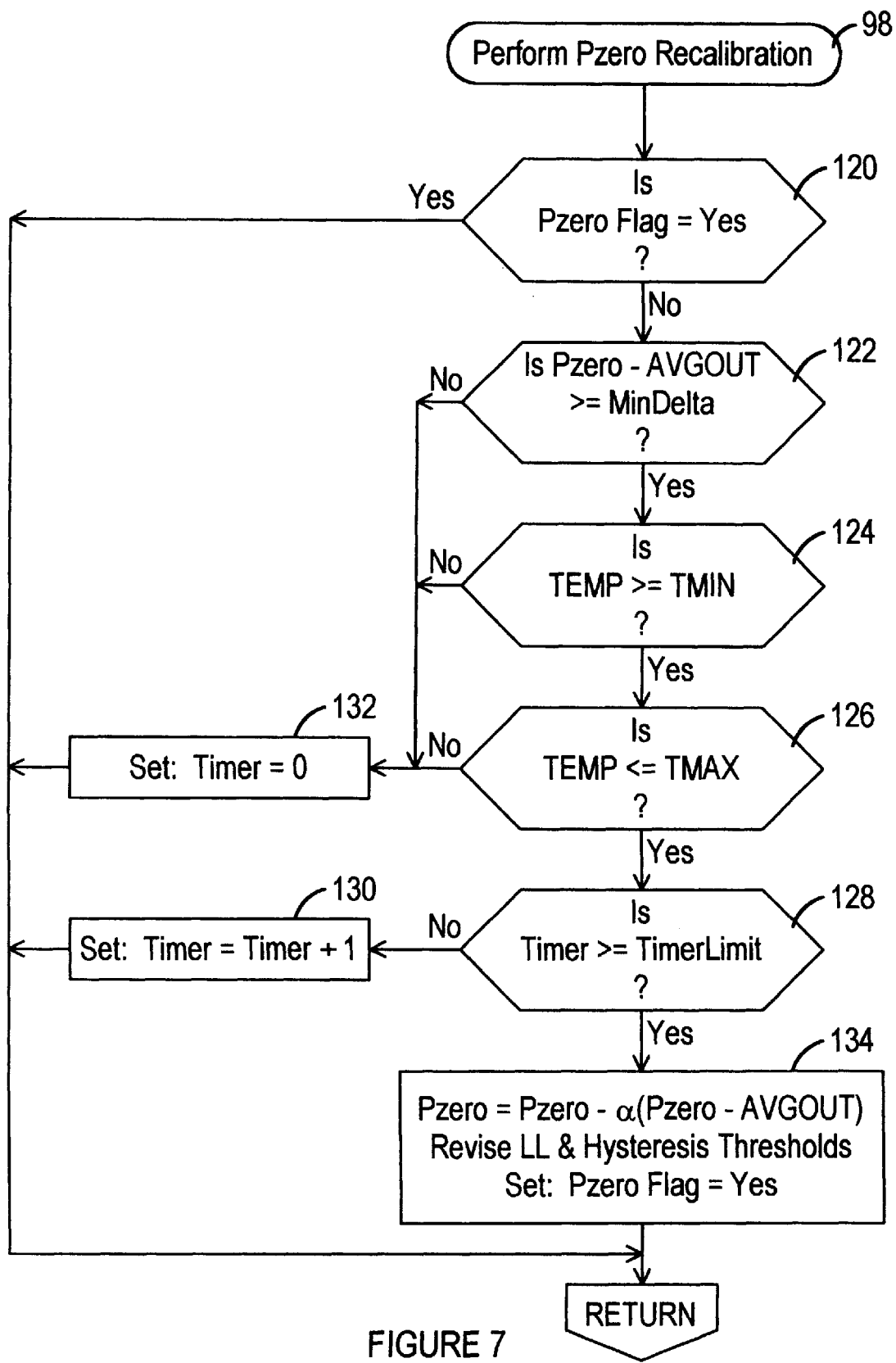

A simple control algorithm based on the above described threshold voltage is depicted in the flow diagrams of FIGS. 6–7. The flow diagram of FIG. 6 represents a main or executive program, whereas the flow diagram of FIG. 7 details a step of the main program concerning adaptive re-calibration of Pzero.

Referring to the main flow diagram of FIG. 6, the block 90 designates a series of program instructions executed at the initiation of vehicle operation for initializing the various registers and variable values, such as the Timer and the Pzero flag. Also, the system output variable, STATUS, is initially set to a state which inhibits deployment. Thereafter, the block 92 is executed to repeatedly sample the pressure sensor output voltage for a predefined interval to obtain an average output voltage AVGOUT, and to compensate AVGOUT for the temperature sensed by temperature sensor 30. If the temperature compensated value of AVGOUT is less than the current vacant seat pressure Pzero, as determined at block 94, the blocks 96 and 98 are executed to set STATUS to a state which inhibits deployment, and to carry out the Pzero re-calibration routine detailed in FIG. 7. If AVGOUT is at least as large as Pzero, the block 100 sets a re-calibration Timer to zero, and the blocks 102–106 are executed to determine whether deployment should be inhibited or allowed based on the value of AVGOUT relative to the LL Threshold and a Hysteresis Threshold. If AVGOUT is below the LL Threshold, the block 108 sets the output variable STATUS to Inhibit, inhibiting deployment of the restraints. If AVGOUT is above the Hysteresis Threshold, the block 110 sets STATUS to Allow, allowing deployment of the restraints if the normal deployment criteria are met. If AVGOUT is between the LL and Hysteresis Thresholds, the blocks 112 or 114 maintain STATUS at its previous value. As indicated above, the LL Threshold may have a value of approximately 1.82 volts, corresponding to an occupant weight of 105 lbs.; the Hysteresis Threshold may have a value of 1.86, corresponding to an occupant weight of, say 107 lbs.

Referring to FIG. 7, the first step of the re-calibration routine is to determine if a Pzero has already been adaptively adjusted in the current ignition cycle. This is achieved by checking the status of the Pzero flag, which is set to a NO value at initialization, as noted above. If the Pzero flag has a YES value, as determined at block 120, the remainder of the routine is skipped. If the Pzero flag still has a No value, the blocks 122–128 are executed to determine if certain re-calibration criteria have been met. Block 122 determines if AVGOUT is at least a certain amount (MinDelta) lower than the current value of Pzero. Block 124 determines if the sensed temperature TEMP is at or above a minimum re-calibration temperature limit TMIN, and block 126 determines if TEMP is at or below a maximum re-calibration temperature limit TMAX. Example values of TMIN and TMAX are 21 and 28 degrees C., respectively. Finally, block 128 determines if the criteria defined by blocks 122–126 have been met for at least a predetermined time, TimerLimit. An example value of TimerLimit is a count corresponding to approximately 10 minutes. If the criteria defined by blocks 122–126 are met, the block 130 increments the Timer, but if any of the criteria are not met, the block 132 re-sets the Timer to zero. Thus, the Timer functions to prevent re-calibration in response to transient fluctuations of the sensed pressure. As indicated above, the Timer is also reset to zero each time AVGOUT is determined to be greater than or equal to Pzero; see blocks 94 and 100 of FIG. 6.

If the re-calibration criteria are met (i.e., block 128 answered in the affirmative), the block 134 is executed to compute a new value of Pzero, to revise the threshold voltages used to enable or disable deployment, and to set the Pzero flag to a YES value, indicating that re-calibration of Pzero has occurred. The new value of Pzero is determined by decreasing the previous value by a fraction α of the difference between the previous value and the current value of AVGOUT. This may be expressed algebraically as:

$$Pzero = Pzero - \alpha \, (Pzero - AVGOUT)$$

where the fraction α is predefined, and may have a value of approximately 0.5. Alternatively, it may be desired to adjust the value of the fraction α downward over time since most of the shifting of Pzero due to aging effects occurs in the first several months of usage. In the implementation of FIG. 6, the LL and Hysteresis Thresholds are also re-calibrated to reflect the new lower vacant seat pressure Pzero since AVGOUT is compared directly to the respective thresholds. This may be done by reducing the thresholds by the same amount as Pzero is reduced due to re-calibration, as expressed by the equations:

$$LL \text{ Threshold} = LL \text{ Threshold} - \alpha \, (Pzero - AVGOUT)$$

$$Hysteresis \text{ Threshold} = Hysteresis \text{ Threshold} - \alpha \, (Pzero - AVGOUT)$$

It should be understood that the simple control described above is exemplary in nature, and could be modified to provide a more precise output as described above in reference to FIG. 1, for example. Likewise, it should be understood in general that while the occupant weight estimation apparatus of this invention has been described in reference to the illustrated embodiments, various modifications will occur to persons skilled in the art. For example, this invention is not limited to pressure based bladder systems, and may be applied equally as well to other force sensing occupant weight detection systems where the vacant seat pressure or force reading changes over time due to aging effects of the seat. Accordingly, occupant weight estimation systems incorporating these and other modifications may fall within the scope of this invention, which is defined by the appended claims.

The embodiments of the invention in which an exclusive property or privilege is claimed are defined as follows:

1. A system for estimating the weight of an occupant of a seat in a motor vehicle, the seat having a foam cushion bottom, the apparatus comprising:
   a pressure sensor disposed in the foam cushion bottom so as to be responsive to the weight of the occupant, the sensor providing a pressure signal output;
   a temperature sensor for sensing a temperature in proximity to said pressure sensor, and providing a temperature signal output; and
   a controller for estimating the weight of the occupant based on the pressure signal output, the temperature signal output, and a calibrated value corresponding to a pressure signal output when the seat is vacant, the controller including means for adjusting the calibrated value downward in response a pressure signal output that remains lower than the calibrated value for at least a predetermined time, the adjustment being determined as a predetermined fraction of a difference between the pressure signal output and the calibrated value.

2. The system of claim 1, wherein the adjustment of the calibrated value by the controller is inhibited if the sensed temperature is above an upper temperature threshold.

3. The system of claim 1, wherein the adjustment of the calibrated value by the controller is inhibited if the sensed temperature is below a lower temperature threshold.

4. The system of claim 1, wherein the predetermined fraction is adjusted downward over time.

5. The system of claim 1, wherein the adjustment of the calibrated value by the controller is inhibited unless the pressure signal output is lower than the calibrated value by at least a predetermined amount.

6. The system of claim 1, wherein the vehicle includes an ignition voltage for supplying power to the system during a period of vehicle operation, and wherein once the calibrated value has been adjusted by the controller during such period of vehicle operation, further adjustment of the calibrated value during such period of vehicle operation is inhibited.

7. A system for estimating the weight of an occupant of a seat in a motor vehicle, the seat having a foam cushion bottom, the apparatus comprising:

a pressure sensor disposed in the foam cushion bottom so as to be responsive to the weight of the occupant, and providing a pressure signal output, the signal output having a reference value when the seat is vacant;

a temperature sensor for sensing a temperature in proximity to said pressure sensor, and providing a temperature signal output; and a controller for estimating the weight of the occupant by compensating the pressure signal output based on the sensed temperature, and comparing the compensated pressure signal output to a threshold based on said reference value, and for periodically adjusting the reference value downward in response a pressure signal output that remains lower than the reference value for at least a predetermined time, the adjustment being determined as a predetermined fraction of a difference between the pressure signal output and the reference value.

8. The system of claim 7, wherein the adjustment of the reference value by the controller is inhibited if the sensed temperature is above an upper temperature threshold.

9. The system of claim 7, wherein the adjustment of the reference value by the controller is inhibited if the sensed temperature is below a lower temperature threshold.

10. The system of claim 7, wherein the predetermined fraction is adjusted downward over time.

11. The system of claim 7, wherein the adjustment of the reference value by the controller is inhibited unless the pressure signal output is lower than the reference value by at least a predetermined amount.

12. The system of claim 7, wherein the vehicle includes an ignition voltage for supplying power to the system during a period of vehicle operation, and wherein once the reference value has been adjusted by the controller during such period of vehicle operation, further adjustment of the reference value during such period of vehicle operation is inhibited.

\* \* \* \* \*